United States Patent [19]
Bloomquist et al.

[11] Patent Number: 5,936,816
[45] Date of Patent: Aug. 10, 1999

[54] INTEGRATED CLEANING AND LEADER TAPE

[75] Inventors: Darrel R. Bloomquist, Meridian; Thomas W. von Alten, Boise, both of Id.

[73] Assignee: Hewlett-Packard Company, Palo Alto, Calif.

[21] Appl. No.: 08/896,848

[22] Filed: Jul. 17, 1997

[51] Int. Cl.[6] .......................................................... G11B 5/41

[52] U.S. Cl. ...................................... 360/128; 15/DIG. 12

[58] Field of Search ................................ 360/128, 69, 71, 360/137; 15/DIG. 12, 210.1

[56] References Cited

U.S. PATENT DOCUMENTS

| | | | |
|---|---|---|---|
| 4,422,119 | 12/1983 | Kawakami et al. | 360/128 |
| 5,495,371 | 2/1996 | Munemoto et al. | 360/71 |
| 5,638,236 | 6/1997 | Scott | 360/128 |

*Primary Examiner*—George J. Letscher

[57] ABSTRACT

Magnetic tape (13) on a supply reel (11) is provided with a trailing end leader (27) which has an abrasive cleaning characteristic. In order to effectively use the leader with the cleaning characteristic, the tape is fully unreeled to expose the abrasive leader (27) only when a requirement to clean the tape head transducers is sensed. During normal operation, the trailing leader (25) which includes the cleaning leader (27) is not exposed to the tape transducer head, but instead remains on the supply reel.

10 Claims, 2 Drawing Sheets

INTEGRATED CLEANING AND LEADER TAPE

FIELD OF THE INVENTION

This invention relates to magnetic tape recording and playback systems, and, more particularly, to a system which uses specialized leader tape in order to effect improved cleaning of a recording and playback mechanism.

BACKGROUND OF THE INVENTION

Magnetic tape recording/playback systems are subject to degradation by the accumulation of debris on the magnetic transducer head, and must be periodically cleaned. This can require the interruption of normal processing (of a stream of data for a digital computer memory storage device, for example) and user intervention. This invention integrates cleaning means in the form of a section of abrasive tape used for a leader at the end of the medium. A recording/playback mechanism can respond to an increase in error rate by automatically moving to the end of the recording medium, employing the cleaning tape/leader as needed, and resuming the recording or playback process without the need for manual intervention.

One prior art technique used a separate "cleaning cartridge" to perform the necessary maintenance on the recording transducer. The recording/playback process must be stopped, the data cartridge removed, and the cleaning cartridge inserted. When cleaning is complete, the cleaning cartridge must be removed and the data cartridge reinserted. Only after these two operations can the recording/playback process be resumed. In order to automate the process, an autochanger mechanism or tape library can have one or more cleaning cartridges in its storage magazine(s). This reduces the impact of the cartridge swaps, but two cartridge swaps are still required to perform the cleaning operation.

A problem with cleaning tape designed for routine cleaning is that if excessive tape head wear is to be avoided, the cleaning tape is only partially effective. If the cleaning tape is made sufficiently effective to thoroughly remove debris from the read/write heads, then a routine must be established for using the cleaning tape only when necessary.

In the use of magnetic tape for storage of computer data, errors, even infrequent in occurrence, represent a significant problem. In some applications, loss of analog or digital data must be significant before the equipment becomes unusable. The user is able to perform a cleaning operation in response to recognized dropout errors but does not immediately lose the ability to use the equipment prior to cleaning. In contrast, the loss of a single bit of computer data can be of significant import and recovery from each error must be done in a manner that ensures error-free data storage and retrieval. While error correction is possible, data loss can still present problems.

Existing linear and helical scan tape drives that are used for storage and retrieval of computer data make use of a single reel magnetic tape cartridge to house the magnetic tape media. This media format uses a special leader or leader block attached to one end of the magnetic tape to enable the tape drive to extract the magnetic tape from the magnetic tape cartridge.

"Leader tape" constructed of thicker, stronger tape is sometimes used between the tape that forms the magnetic storage medium, and the hub reel. Leader tape has performed various functions, including identification, timing and an ability to resist wear. Leader tape can be located at any location on the tape, although it is usually at the ends of a reel of tape. The leader can be at either end of the reel, so that "leader tape" can be at the trailing end of a supply reel. Such tape located at the end of a reel may be referred to as "trailer tape." For the purposes of this document, "leader tape" will be used to refer to the type of tape, rather than its location, and therefore should include "trailer tape."

"Tape recorder" is intended to mean magnetic tape transcription equipment. This includes standard tape recorders with fixed or movable heads, as well as arcuate scan and helical scan tape transcription equipment used in analog and digital tape recorders. In the preferred embodiment, a linear transcription heads is employed, although the invention has application in other tape recording environments. "Transcription" is intended to mean read and/or write operations of the tape recorder, and is not intended to be limited to a particular use for the data.

Prior art music cassette tapes have included special material on leader tape. Such leader tapes were designed to be crossed at each beginning sequence of operating the tape. If the leader tape had an abrasive cleaner of sufficient strength for cleaning the tape head when such cleaning is necessary, then the leader tape would tend to cause undue wear of the tape heads. That is because each use of the tape from the end would result in such abrasive cleaning. Therefore, end of tape leaders had a limitation in that it was necessary that the cleaning effectiveness be reduced so that excess wear would not result from the use of such tapes.

Under ideal circumstances, a mildly abrasive cleaning tape should be run across the tape head at intervals as determined by the need for cleaning the tape head. This determination can be made manually or by detecting recording characteristics.

SUMMARY OF THE INVENTION

In accordance with the present invention, a magnetic tape is provided with a cleaning leader which includes a mildly abrasive cleaning surface. The cleaning leader is leader tape attached to an end of a supply reel which does not engage a tape recorder's tape heads during routine transcription operations. The cleaning leader is located at a trailing end of a supply reel of tape so that, during normal operation, the abrasive surface is not run across a tape head of a tape recorder. When cleaning is desired, the tape is wound to the cleaning leader at the trailing end and the cleaning leader is allowed to contact the tape head to effect cleaning.

Routine cleaning is thereby limited to that necessary to maintain the heads in operating condition, as determined by operating functions, as opposed to effecting the cleaning by routine operation of the tape.

According to one aspect of the invention, a tape recorder is operated with a tape having a cleaning leader at a specified location. In response to a detection of a need to clean a tape transducer head, the tape is advanced to cause the cleaning leader to cross the head. This advancing of the tape results in the leader effecting a cleaning operation on the tape transducer head. After the cleaning operation, the tape recorder continues operation. In the preferred embodiment, the cleaning leader is at an inside hub end of a supply reel, so that the cleaning leader does not engage the transducer head until such time as cleaning is desired.

In a preferred embodiment of the invention, the leader is at an end of the tape which is generally not encountered during normal operation of the tape. Tape cleaning can be effected by deliberately winding the leader to a position where it is encountered. This permits tape cleaning to be performed without removing the tape but does not occur during normal transcription operation of the tape. In a preferred embodiment, the cleaning section is at an inner end of the supply reel of the tape, so that in normal operation, the cleaning leader does not pass over the tape head and related hardware. When cleaning is required, the tape is moved further than normally required to reach the end of the supply reel, so that the cleaning leader is passed over the tape head transducers. In this way, the cleaning material is inexpensively and effectively combined with the magnetic storage medium. The use of this invention reduces or eliminates the need for a separate cleaning cartridge and the need for manual user intervention in the recording/playback process in determining the need for cleaning and in effecting the cleaning operation. Even if a separate cleaning cartridge is sometimes required, the ability to recover in the middle of a failed operation without user intervention is of particular value.

A need for cleaning is determined by detecting a reduction in a read signal, or a dropout in a read signal following a predetermined write signal level. Algorithms for detecting a need for cleaning are well-known and would be dependent on the specific circuitry of the transcription equipment and type of tape used for transcription.

DETAILED DESCRIPTION OF THE PREFERRED EMBODIMENTS

Figure 1:
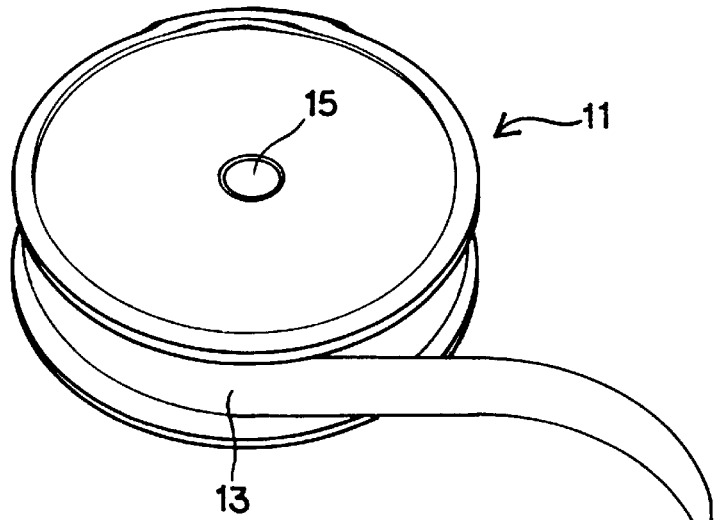
FIG. 1 shows a reel of magnetic tape, in which an inner end leader is provided.
Figure 2:
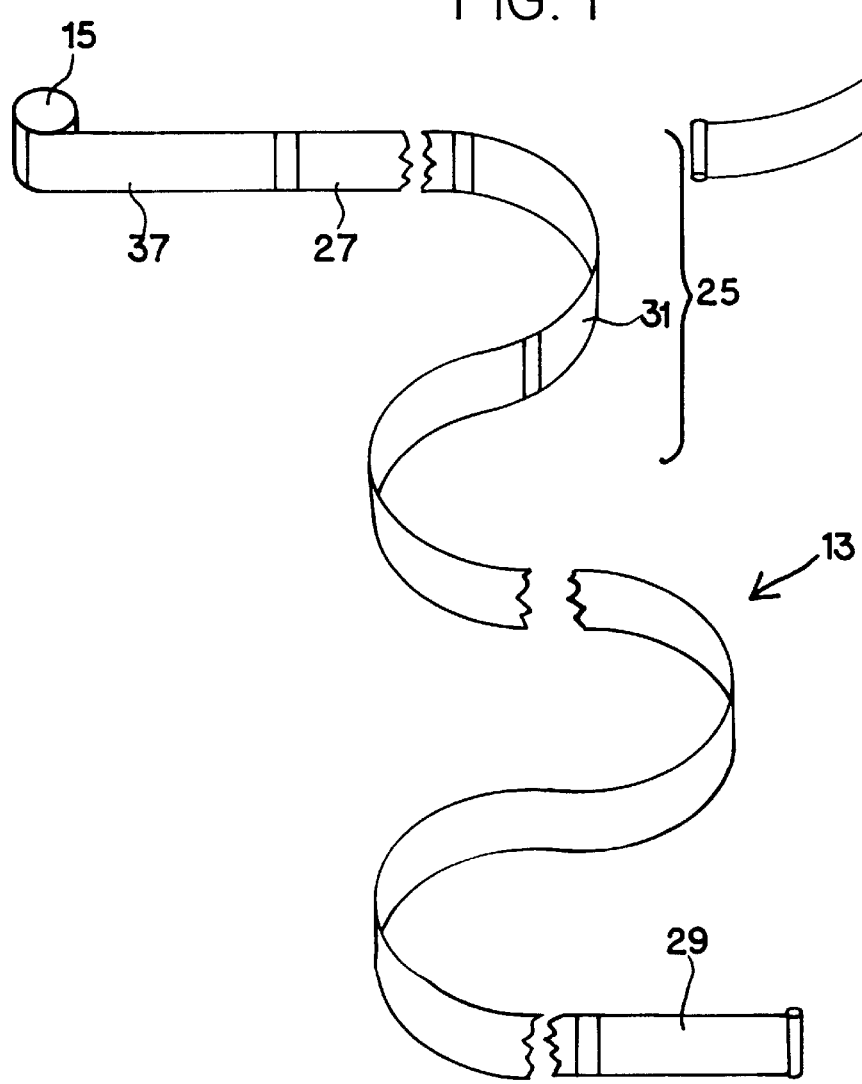
FIG. 2 diagrammatically shows the arrangement of parts of the tape on the reel.
Figure 3:
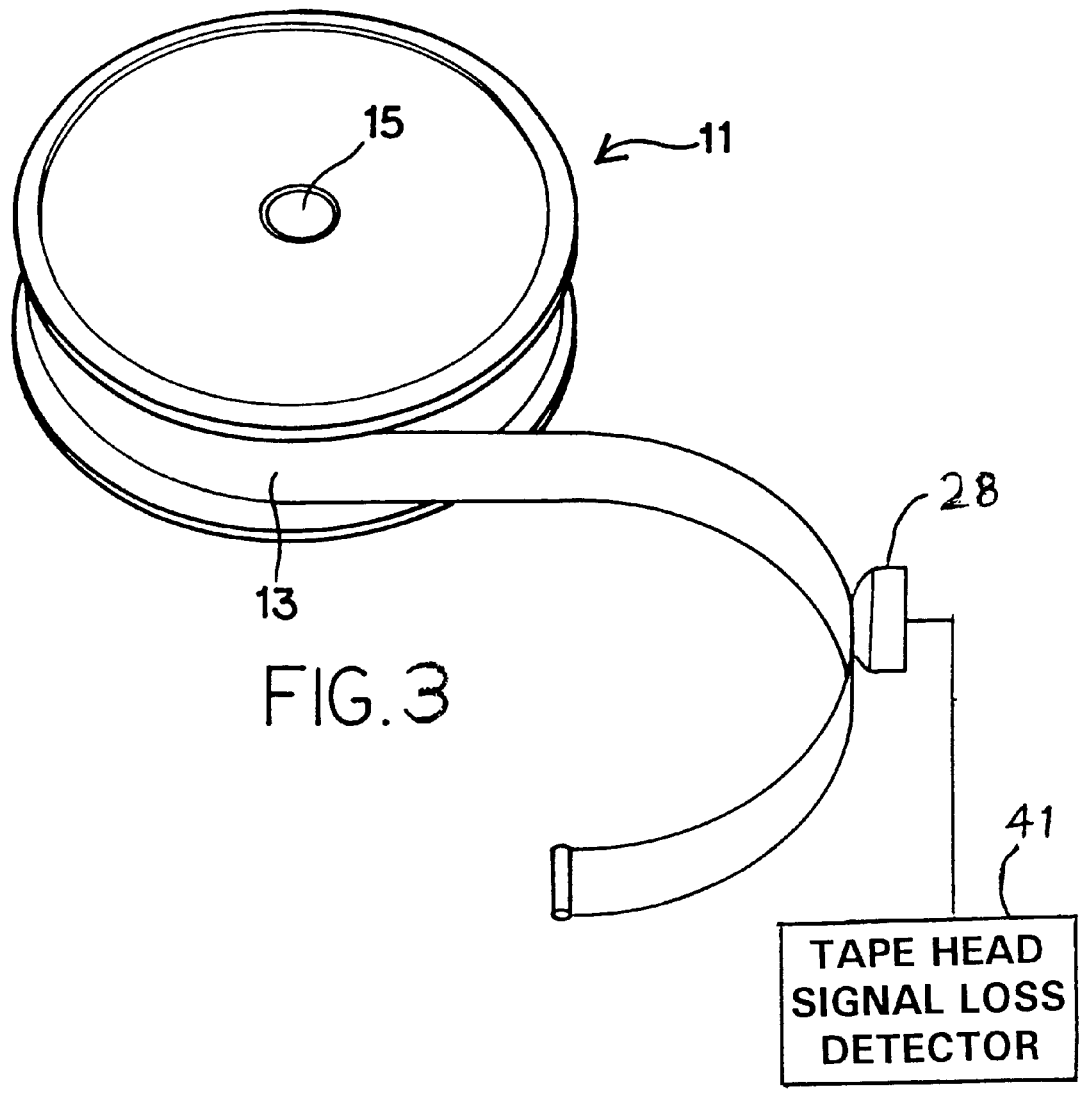
FIG. 3 diagrammatically shows the use of the tape with a transducer head and the detection of a condition requiring cleaning.

Referring to FIGS. 1–3, a reel 11 of magnetic tape 13 is shown. FIG. 1 shows the physical appearance of the reel 11 of tape, and FIG. 2 shows the sequential arrangement of portions of the tape 13.

On an inner end of the reel 11, adjacent a hub 15, is leader tape 25. The leader tape 25 includes a section of abrasive cleaning leader tape 27, which includes abrasive material for cleaning tape heads 28 or transducers (not shown). If the leader is run across the tape heads, this action results in the tape heads being cleaned. The mere presence of the abrasive material results in the tape head being cleaned because the helical tape head itself is in motion during operation. The cleaning and abrasion of the tape heads occurs only when the abrasive cleaning leader 27 is present at the tape heads. Therefore, during normal operation of the tape 13, the leader abrasive cleaning leader 27 does not come into contact with the tape heads and, therefore, neither cleans nor abrades tape heads of a tape recording device (not shown).

It is also contemplated that a take-up end of the tape 13 may be provided with leader 29. The leader 29 at the take-up end would pass the tape heads upon loading of the tape 13.

Referring to FIG. 2, the leader tape 25 may include multiple segments, according to preference of manufacture. The abrasive cleaning leader 27 performs the aforementioned cleaning function. An additional cleaning leader 31 may be included to provide an option for less aggressive cleaning. Connecting leader sections, such as leader 37, which do not function relative to cleaning, may also be provided. A signal strip may be used to indicate the beginning of the leader tape 25.

It is also possible to provide cleaning leader, such as leader 31, as non-abrasive. While non-abrasive cleaning raises less issues of tape head wear, limiting cleaning according to the invention may extend the useful life of the cleaning section.

In operation, the magnetic tape is operated so that the magnetic tape 13 comes into contact with the tape heads 28 and read/write operations are performed. When a read operation is effected and a reduced output is detected, it is determined that the tape transducer head requires cleaning. This is accomplished by running the tape 13 to the end of the reel 11, adjacent the hub 15 where the abrasive cleaning leader tape 27 is stored. The abrasive cleaning leader tape 27 is then passed across the transducer heads 28 and cleaning is effected. After the cleaning is effected, the leader 25 is retracted back onto the reel 11 and the tape 13 is operated normally until the next time cleaning is required.

Since loss of data is a critical concern in some applications, such as storage of digital computer data, the detection of a need to clean the heads 28 is preferably accomplished automatically, as shown by detector 41. Techniques for detection of a need to clean the heads 28 are well known to those skilled in the art of tape transcription equipment. By responding to such detection by initiating a cleaning operation, cleaning is caused to occur automatically when required. In this manner, the cleaning operation can be accomplished without user intervention.

In the preferred embodiment, detection and cleaning would occur during the normal operation of the tape transcription equipment. If the detection of the need to clean the heads is accomplished before the need to clean the heads becomes a prerequisite to normal transcription, it is possible to effect the cleaning procedure during a quiescent time of operation during which transcription is not anticipated.

Of course, many variations can be made to the preferred embodiment which is described and shown herein without departing from the spirit and scope of the present invention. While tape provided on a single reel is described in the preferred embodiment, the present invention has utility on tape supplied in multi-reel cassettes, and on other cassette configurations. It is also possible to provide a selectively usable cleaning tape in a configuration which requires that the cleaning tape be separated from the heads with tape lifters when cleaning is desired, as would be the case with continuous or endless reel tapes. While abrasive cleaning is described, it is contemplated that the inventive techniques would be useful on non-abrasive cleaning tape.

For this reason, the described embodiments are not to be limiting to the scope of patent protection. Instead, our patent protection should be determined by the following claims interpreted according to accepted doctrines of claim interpretation, including the doctrine of equivalents and reversal of parts.

What is claimed is:

1. Method for transducing information to or from magnetic tape comprising:
   a. providing a tape for storing said information;
   b. providing a leader at one end of said tape for storing said information, said leader having an abrasive cleaning characteristic;
   b. operating a tape recorder having a tape transducer head with the tape in order to transfer data between the tape through the tape transducer head;
   c. detecting when the tape transducer head requires cleaning;
   d. advancing the tape to the leader in response to said detected need for cleaning, said advancing the tape to the leader resulting in the leader effecting a cleaning operation on the tape transducer head without a requirement for mechanically unmounting the tape from a drive mechanism; and e. continuing operation of the tape operating equipment subsequent to said cleaning, while ensuring that the leader having the abrasive cleaning characteristic does not pass across the transducer head during normal operation of the tape.

2. Method as described in claim 1 comprising detecting when the tape transducer head requires cleaning by detecting signals transduced through the tape transducer head.

3. Method as described in claim 1 comprising providing said leader at a trailing end of a supply reel of tape, such that in order to pass the leader across the tape transducer head, the remainder of the tape must first unreel from the supply reel, thereby ensuring that the leader having the abrasive cleaning characteristic does not pass across the transducer head during normal operation of the tape.

4. Method as described in claim 1 comprising providing said tape on a single supply reel, with said trailing end located adjacent to a hub of the supply reel.

5. Method for transducing information to and from magnetic tape comprising:

a. providing a tape for storing said information, and further providing on said tape a tape leader having an abrasive characteristic;

b. detecting a condition related to a requirement for cleaning of a tape transducer head;

b. in response to said detection, advancing the tape to a tape leader having an abrasive characteristic, said advancing the tape to the tape leader effecting a cleaning operation on the tape transducer head without a requirement for mechanically unmounting the tape from a drive mechanism;

e. continuing operation of the tape operating equipment subsequent to said cleaning; and f. ensuring that the tape leader having the abrasive cleaning characteristic does not pass across the tape heads during normal operation of the tape.

6. Method as described in claim 5 comprising providing said leader tape at a trailing end of a supply reel of tape, thereby ensuring that the leader having the abrasive cleaning characteristic does not pass across the transducer head except during said cleaning operation.

7. Method as described in claim 5 comprising performing said advancing the tape to the leader and continuing operation of the tape operating equipment as an automatic sequence of operations, thereby effecting said cleaning operation without operator intervention.

8. Method as described in claim 7 comprising detecting when the tape transducer head requires cleaning by detecting signals transduced through the tape transducer head.

9. Method as described in claim 5 comprising providing said leader at a trailing end of a supply reel of tape, such that in order to pass the leader across the tape transducer head, the remainder of the tape must first unreel from the supply reel, thereby ensuring that the leader having the abrasive cleaning characteristic does not pass across the transducer head during normal operation of the tape.

10. Method as described in claim 5 comprising providing said tape on a single supply reel, with said trailing end located adjacent to a hub of the supply reel.

\* \* \* \* \*